United States Patent [19]

Maresca et al.

[11] Patent Number: 5,605,978
[45] Date of Patent: Feb. 25, 1997

[54] BLOCK POLYSILOXANE-POLYCARBONATE COPOLYMER BLENDS WITH POLYAMIDES

[75] Inventors: Louis M. Maresca, Pittsfield, Mass.; Raymond Z. Naar, Delmar, N.Y.

[73] Assignee: General Electric Company, Pittsfield, Mass.

[21] Appl. No.: 542,101

[22] Filed: Oct. 12, 1995

Related U.S. Application Data

[63] Continuation of Ser. No. 255,835, Jun. 7, 1994, abandoned, which is a continuation of Ser. No. 65,074, May 19, 1993, abandoned, which is a continuation of Ser. No. 397,334, Aug. 22, 1989, abandoned, which is a continuation of Ser. No. 109,121, Oct. 16, 1987, abandoned.

[51] Int. Cl.[6] .............................. C08L 77/06; C08L 69/00
[52] U.S. Cl. ............................................. 525/431; 525/433
[58] Field of Search ...................................... 525/431, 437

[56] References Cited

U.S. PATENT DOCUMENTS

| | | | |
|---|---|---|---|
| 4,027,072 | 5/1977 | Molari | 428/412 |
| 4,086,295 | 4/1978 | Mori et al. | 525/433 |
| 4,387,193 | 6/1983 | Giles | 525/431 |
| 4,430,484 | 2/1984 | Quinn | 525/433 |
| 4,732,934 | 3/1988 | Hathaway et al. | 525/431 |
| 4,735,999 | 4/1988 | Patterson et al. | 525/431 |

FOREIGN PATENT DOCUMENTS

| | | | |
|---|---|---|---|
| 0068368 | 4/1984 | Japan | 525/433 |

*Primary Examiner*—Ralph H. Dean

[57] ABSTRACT

Thermoplastic molding compositions comprising blends of a block polysiloxane—polycarbonate copolymer and a polyamide resin are useful for extruding articles such as films.

5 Claims, No Drawings

BLOCK POLYSILOXANE-POLYCARBONATE COPOLYMER BLENDS WITH POLYAMIDES

This is a continuation of Ser. No. 08/255,835 filed on Jun. 7, 1994 now abandoned, which is a continuation of Ser. No. 08/065,074 filed May 19,1993 now abandoned, which is a continuation of Ser. No. 07/397,334 filed Aug. 22, 1989 now abandoned, which is a continuation of Ser. No. 07/109,121 filed Oct. 16, 1987 now abandoned.

BACKGROUND OF THE INVENTION

1. Field of The Invention

The invention relates to thermoplastic molding compositions of synthetic polymeric resins and in particular to blends of diverse resins including a polyamide and a block polysiloxane—polycarbonate copolymer.

2. Brief Description of the Prior Art

The block polysiloxane—polycarbonate copolymers are well known structural adhesive compositions and are described, for example, in the U.S. Pat. Nos. 4,027,072 and 4,123,588. Polyamides are also well known polymeric resins, but they are not often compatible with other resins, for example polycarbonates since they differ from polycarbonate resins in respect to structure, molecular weight, functional groups, polarity and solubility.

The present invention is based on our finding that blends of polysiloxane—polycarbonate block copolymers and polyamide resins in certain proportions are compatible and may be formed into articles which exhibit excellent mechanical properties and a resistance to delamination (an indication of phase compatibility).

SUMMARY OF THE INVENTION

The invention comprises a thermoplastic molding composition, which comprises;

a block polysiloxane—polycarbonate copolymer; and a thermoplastic, polyamide.

The invention also comprises articles molded from the compositions of the invention and which are useful for a wide variety of applications.

The compositions of the invention are useful for the thermoplastic extrusion of films and for injection molding of complex parts.

DETAILED DESCRIPTION OF THE PREFERRED EMBODIMENTS OF THE INVENTION

The block polysiloxane—polycarbonate copolymers employed in the compositions of the invention are generally well known resins as are methods of their preparation; see for example the preparative descriptions given in the U.S. Pat. Nos. 4,027,072 and 4,123,588, both of which are hereby incorporated herein by reference thereto. Representative of the polysiloxane—polycarbonate copolymers advantageously employed in the compositions of the invention are those prepared by reacting (A) a halogen chain-stopped polydiorgano—siloxane composed of from about 5 to 200 chemically combined diorganosiloxy units consisting essentially of dialkylsiloxy units which are connected to each other by silicon-oxygen-silicon linkages wherein each of the silicon atoms has two organo radicals attached through a carbon-silicon bond, and (B) a dihydric phenol having the formula:

HO—D—OH wherein D represents a divalent aromatic radical; and phosgenating the purified reaction product with or without additional dihydric phenol until the resulting copolymer achieves a maximum intrinsic viscosity, i.e.; completion of the reaction.

Typical dihydric phenols useful in formulating the polysiloxane—polycarbonate copolymers as described above, may be represented by the general formula:

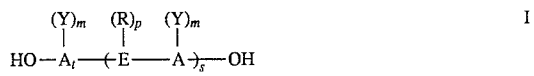

in which A is an aromatic group such as phenylene, biphenylene, naphthylene, anthrylene, etc. E may be an alkylene or alkylidene group such as methylene, ethylene, propylene, propylidene, isopropylidene, butylene, butylidene, isobutylidene, amylene, isoamylene, amylidene, isoamylidene, and generally from one to twelve carbon atoms, inclusive. Where E is an alkylene or alkylidene group, it may also consist of two or more alkylene or alkylidene groups, connected by a non-alkylene or non-alkylidene group, such as an aromatic linkage, a tertiary amino linkage, an ether linkage, a carbonyl linkage, a silicon-containing linkage, or by a sulfur-containing linkage such as sulfide, sulfoxide, sulfone, etc. In addition, E may be a cycloaliphatic group of five to twelve carbon atoms, inclusive (e.g. cyclopentyl, cyclohexyl), or a cycloalkylidene of five to twelve carbon atoms, inclusive, such as cyclohexylidene; a sulfur-containing linkage such as sulfide, sulfoxide, sulfone; an ether linkage; a carbonyl group; a direct bond; a tertiary nitrogen group; or a silicon-containing linkage such as silane or siloxy. Other groups which E may represent will occur to those skilled in the art. R is hydrogen or a monovalent hydrocarbon group such as alkyl of one to eight carbon atoms, inclusive (methyl, ethyl, propyl); aryl of 6 to 20 carbon atoms, inclusive, (phenyl, naphthyl); aralkyl of 7 to 20 carbon atoms, inclusive, (benzyl, ethylphenyl); or cycloaliphatic of five to twelve carbon atoms, inclusive (cyclopentyl, cyclohexyl). Y may be an inorganic atom such as chlorine, bromine, fluorine, etc; an organic group such as the nitro group or a nitrile group; an organic group such as R above; or an oxy group such as OR, it being only necessary that Y be inert to and unaffected by the reactants and the reaction conditions. The letter m is any whole number from and including zero through the number of positions on A available for substitution; p is any whole number from and including zero through the number of available positions on E; t is a whole number equal to at least one; and s is any whole number from and including zero to twenty.

In the typical dihydric phenol compound represented by Formula I above, when more than one Y substituent is present, they may be the same or different. The same is true for the R substituent. Where s is greater than one, E can be the same or different. Where E is a direct bond, the aromatic rings are directly joined with no intervening alkylene or other bridge. The positions of the hydroxyl groups and Y on the aromatic nuclear residues, A, can be varied in the ortho, meta, or para positions; and the groupings can be in a vicinal, nonsymmetrical or symmetrical relationship, where two or more ring carbon atoms of the aromatic hydrocarbon residue are substituted with Y and a hydroxyl group.

Examples of dihydric phenol compounds that may be employed in the above polymers include:
2,2-bis-(4-hydroxyphenyl)propane, or (bisphenol-A);
2,4'-dihydroxydiphenylmethane;

bis-(2-hydroxyphenyl)methane;
bis-(4-hydroxyphenyl)methane;
bis-(4-hydroxy-5-nitrophenyl)methane;
bis-(4-hydroxy-2,6-dimethyl-3-methoxyphenyl)methane;
1,1-bis-(4-hydroxyphenyl)ethane;
1,2-bis-(4-hydroxyphenyl)ethane;
1,1-bis-(4-hydroxy-2-chlorophenyl)ethane;
1,1-bis-(2,5-dimethyl-4-hydroxyphenyl)ethane;
1,3-bis-(3-methyl-4-hydroxyphenyl)propane;
2,2-bis-(3-phenyl-4-hydroxyphenyl)propane;
2,2-bis-(3-isopropyl-4-hydroxyphenyl)propane;
1,1-bis-(4-hydroxyphenyl)propane;
2,2-bis-(4-hydroxyphenyl)pentane;
3,3-bis-(4-hydroxyphenyl)pentane;
2,2-bis-(4-hydroxyphenyl)heptane;
bis-(4-hydroxyphenyl)phenylmethane;
bis-(4-hydroxyphenyl)cyclohexymethane;
1,2-bis-(4-hydroxyphenyl)-1,2-bis-(phenyl)propane;
2,2-bis-(4-hydroxyphenyl)-1-phenylpropane; and the like.

Also included are dihydroxybenzenes typified by hydroquinone and resorcinol; dihydroxydiphenyls such as 4,4'-dihydroxydiphenyl; 2,2' dihydroxydiphenyl; 2,4'-dihydroxydiphenyl; dihydroxy-naphthalenes such as 2,6-dihydroxynaphthalene, etc.

Also useful are dihydroxydiphenyl sulfone; 3-chloro-bis-(4-hydroxyphenyl)sulfone; and 4,4' dihydroxytriphenyldisulfone; etc. The preparation of these and other useful sulfones are described in U.S. Pat. No. 2,288,282. Hydroxy terminated polysulfones as well as substituted sulfones using halogen, nitrogen, alkyl radicals, etc., are also useful.

Dihydroxy aromatic ethers such as those described in U.S. Pat. No. 3,148,172 are also useful as the dihydric phenol. The dihydroxy aromatic ethers may be prepared as described in U.S. Pat. No. 2,739,171. Illustrative of such compounds are the following:

4,4'-dihydroxydiphenyl ether;
4,4'-dihydroxytriphenyl ether;
the 4,3'-, 4,2'-, 4,1'-, 2,2'-, 2,3'-dihydroxydiphenyl ethers;
4,4'-dihydroxy-2,6-dimethyldiphenyl ether;
4,4'-dihydroxy-2,5-dimethyldiphenyl ether;
4,4'-dihydroxy-3,3'-diisobutyldiphenyl ether;
4,4'-dihydroxy-3,3'-diisopropyldiphenyl ether;
4,4'-dihydroxy-3,3'-dinitrodiphenyl ether;
4,4'-dihydroxy-3,3'-dichlorodiphenyl ether;
4,4'-dihydroxy-3,3'-difluorodiphenyl ether;
4,4'-dihydroxy-2,3'-dibromodiphenyl ether;
6,6'-dihydroxydinaphthyl-2,2'-ether;
6,6'-dihydroxy-5,5'-dichlorodinaphthyl-2,2'-ether;
4,4'-dihydroxypentaphenyl ether;
4,4'-dihydroxy-2,6-dimethoxydiphenyl ether; and
4,4-dihydroxy-2,5-diethoxydiphenyl ether, etc.

Mixtures of the dihydric phenols can also be employed, and where dihydric phenol is mentioned herein, mixtures of such materials are considered to be included. Other dihydric phenols which are suitable are disclosed in U.S. Pat. Nos. 2,999,835; 3,028,365; 3,334,154; 4,131,575.

Preferred dihydric phenols are represented by those of the formula:

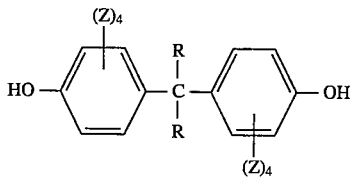

where Z is a member selected from the class consisting of hydrogen, lower alkyl radicals and halogen radicals and combinations thereof, and R is a member selected from the class consisting of hydrogen, hydrocarbyl and halogenated hydrocarbyl radicals.

It will be appreciated from the above description that polysiloxane—polycarbonate block copolymers employed as a component of the blends of the invention may be represented by those having recurring chain units of the formula:

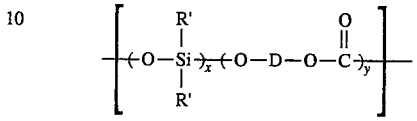

wherein D has the meaning previously ascribed to it; R' represents lower alkyl; x represents an integer of from 1 to 200 and y represents an integer such that x+y is 2 to 1000. Other chain units may be present in the polymer.

The term "halogen" as used herein is embracive of chlorine, bromine, iodine and fluorine.

The term "hydrocarbyl" as used herein means the monovalent moiety obtained upon removal of a hydrogen atom from a parent hydrocarbon. Representative of hydrocarbyl are alkyl of 1 to 20 carbon atoms, inclusive, such as methyl, ethyl, propyl, butyl, pentyl, hexyl, heptyl, octyl, nonyl, undecyl, decyl, dodecyl, tridecyl, tetradecyl, pentadecyl, hexadecyl, heptadecyl, octadecyl, nondecyl, eicosyl, and isomeric forms thereof; cycloalkyl of 3 to 8 carbon atoms, inclusive, such as cyclopropyl, cyclobutyl and the like; alkenyl of 2 to 20 carbon atoms, inclusive, such a vinyl, allyl, butenyl, pentenyl, hexenyl, octenyl, noneyl, decenyl, undecenyl, dodecenyl, tridecenyl, pentadecenyl, octadecenyl, and isomeric forms thereof; aryl such as phenyl, naphthyl and the like; aralkyl of 7 to 20 carbon atoms such as phenmethyl, phenpentyl, phendecyl and isomeric forms thereof.

The term "lower alkyl" is used throughout the specification and claims to mean alkyl as previously defined, having 1 to 6 carbon atoms, inclusive.

Polyamides used in the present invention are also well known as are methods of their preparation. For example, they may be obtained by the procedures described in the Kirk-Othmer Encyclopedia of Chemistry, Second Edition, Vol 16, Pages 4–6 and the cited references. One method comprises polymerizing a monoamino-monocarboxylic acid or a lactam thereof having at least 2 carbon atoms between the amino and carboxylic acid; or by polymerizing substantially equimolar proportions of a diamine and a dicarboxylic acid alone or together with a monoamino-monocarboxylic acid or a lactam thereof as defined above. The dicarboxylic acid may be used in the form of a functional derivative or equivalent thereof, for example, an ester or acid chloride. Herein, where a carboxylic acid, ester, or acid chloride is referred to, those skilled in the art will readily recognize circumstances where the functional equivalent is preferred, i.e., where a dicarboxylic acid is described, the diphenyl ester or acid chloride may be appropriate, or where a diester is described, the carboxylic acid or acid chloride may be appropriate. The term "substantially equimolar" proportions (of the diamine and of the dicarboxylic acid) is used to cover both strict equimolar proportions and slight departures therefrom which are involved in conventional techniques for stabilizing the viscosity of the resultant polyamides.

Examples of the aforementioned monoamino—monocarboxylic acids or lactams thereof which are useful in preparing the polyamides include those compounds containing from 2 to 16 carbon atoms between the amino and carboxylic acid groups, said carbon atoms forming a ring with the —CO—NH— group in the case of a lactam. As particular examples of aminocarboxylic acids and lactams there may be mentioned aminocaproic acid, butyrolactam, pivalolactam, caprolactam, capryllactam, enantholactam, undecanolactam, dodecanolactam and 3- and 4-aminobenzoic acids.

Diamines for use in the preparation of the polyamides include the straight chain and branched, alkyl, aryl and alkyl-aryl diamines. Such diamines include, for example, those represented by the general formula:

wherein n is an integer of from 2 to 16, such as trimethylenediamine, tetramethylenediamine, pentamethylenediamine, hexamethylenediamine and octamethylenediamine, as well as trimethyl hexamethylenediamine, meta-phenylenediamine, para-phenylenediamine, meta-xylylenediamine, para-xylylenediamine and the like.

The dicarboxylic acids referred to above may be aromatic or aliphatic dicarboxylic acids of the formula:

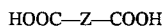

wherein Z represents a divalent aliphatic group containing at least 2 carbon atoms or an aromatic moiety. Examples of such acids are sebacic acid, octadecanedioic acid, suberic acid, glutaric acid, pimelic acid, adipic acid, terephthalic acid, isophthalic acid and isomeric naphthalene dicarboxylic acids.

The polyamide ingredient of the compositions of the invention may be either crystalline, amorphous, or of mixed phase. Typical examples of the polyamides, or nylons, as these are often called, include for example, nylon 6, 6/6, 11, 12, 4/6, 6/4, 6/9, 6/10 and 6/12; polyamides resulting from the reaction of terephthalic acid and/or isophthalic acid and hexamethylene diamine or trimethyl hexamethylenediamine; polyamides resulting from the reaction of adipic acid and meta xylylenediamine; polyamides resulting from the reaction of adipic acid, azelaic acid and 2,2-bis-(p-aminocyclohexyl)-propane; and polyamides resulting from the reaction of terephthalic acid and 4,4'-diamino-dicyclohexylmethane. Mixtures and/or copolymers of two or more of the foregoing polyamides or prepolymers thereof, respectively, are also within the scope of the present invention.

Polyamides used herein may have for example a number average molecular weight ranging from about 12,000 to about 60,000 g/mole, preferably from about 15,000 to about 40,000 g/mole, and most preferably from about 20,000 to about 35,000 g/m, as determined by membrane osmometry; J. Herold, G. Meyerhoff, Eur. Polym. J. 15,525 (1979). Alternately, preferred polyamides may be described as having an intrinsic viscosity ranging from about 0.5 to about 1.6 dl/g, preferably from about 0.7 to about 1.4 dl/g, and most preferably from about 0.9 to about 1.2 dl/g as measured with 40 mg per 10 cc of a 60/40 weight ratio phenol/tetrachloroethane solvent at 30° C.

The weight ratio of polyamide to poly (siloxane-carbonate) block copolymers used in the blends of the invention may be within the range of from 5–95 to 95–5. Preferably the compositions of the invention are blends of a major proportion (50 or more than 50 percent by weight) of the block polysiloxane—polycarbonate copolymer and a minor proportion (less than 50 percent by weight) of the polyamide.

The compositions of the invention may be compounded with conventional processing additives to enhance certain physical properties in the articles to be molded from them.

For example, the composition of the invention may include other ingredients such as impact modifiers, stabilizers, flame retardants, mold release agents, foaming agents, reinforcing agents, pigments, and other thermoplastic resins such as polyesters, polyphenylene ethers, polyimides and the like; fillers, for example, silica, talc, clay, mica, calcium sulfate and calcium carbonate; and reinforcing fibers such as, for example, glass and carbon. The amount of additive present is dependent upon the desired effect and it is within the knowledge of those skilled in the art to determine the appropriate amounts.

Preparing the compositions of the invention may be accomplished by conventional blending, melt blending, solution blending and the like. Melt blending may be accomplished in a conventional extruder, from which the admixture may be molded into an article of specific dimensions or further extruded to a film or sheet product.

The following examples describe the manner and process of making and using the invention and set forth the best mode contemplated by the inventors of carrying out the invention but are not to be construed as limiting. Where reported, the test results provided were determined by the following test procedures:

Tensile Strength, Modulus and Elongation:
  According to the ASTM test method D-638.
Notched Izod Impact Strength (NI):
  According to ASTM test method D-256.
Delamination:
  A representative injection molded tensile bar of the resin blend is stretched on an Instron and observed visually for delamination as indicated by the development of a surface roughness and skinning.

EXAMPLE 1

A blend of 75 parts by weight of a block polysiloxane—polycarbonate prepared as described in U.S. Pat. No. 4,027,072 (LR 3320 Resin; General Electric Company) and 25 parts by weight of an amorphous polyamide resin prepared by the polymerization of hexamethylene diamine with a substantially equivalent proportion of a mixture of terephthalic acid and isophthalic acid (Zytel® 330; E. I. DuPont de Nemours and Company) was compounded on a Werner Pfleiderer ZSK 30 mm twin screw extruder at temperatures of from 260°–280° C. The polymeric components were dried for at least six (6) hours at 110° C. in an air circulating oven prior to extrusion. The resulting pellets, which comprised blends of this invention or the "control" blend, were redried under the same conditions before injection molding into ASTM test specimens on a 3 oz., 75 ton Newbury injection molding machine. The test specimens were subjected to testing for physical properties. The test results are given in the Table 1, below.

EXAMPLE 2

The procedure of Example 1, supra, is repeated except that the Zytel® 330 polyamide as used therein is replaced with an equal proportion of a crystalline polyamide resin (Zytel® 101; E. I. DuPont, supra; a Nylon 6,6). The test results are shown in the Table 1, below.

EXAMPLE 3

The procedure of Example 1, supra, is repeated except that the proportion of the LR 3320 Resin is decreased to 50 parts and the proportion of Zytel® 330 is increased to 50 parts. The test results are shown in the Table 1, below.

EXAMPLE 4

The procedure of Example 3, supra., is repeated a number of times except that the Zytel® 330 as used therein is replaced with an equal proportion of Zytel® 101, supra. The test results are given in the Table 1, below.

EXAMPLE 5

The procedure of Example 1, supra., is repeated except that the proportion of the LR 3320 resin is decreased to 25 parts and the proportion of Zytel® 330 is increased to 75 parts. The test results are shown in the Table 1, below.

EXAMPLE 6

The procedure of Example 5, supra., is repeated except that the Zytel® 30 as used therein is replaced with an equal proportion of Zytel® 101, supra. The test results are given in the Table 1, below.

TABLE 1

| Composition | Examples | | | | | |
|---|---|---|---|---|---|---|
| (Weight %) | 1 | 2 | 3 | 4 | 5 | 6 |
| LR3320 | 75 | 75 | 50 | 50 | 25 | 25 |
| Zytel® 330 | 25 | | 50 | | 75 | |
| Zytel® 101 | | 25 | | 50 | | 75 |
| Physical Properties | | | | | | |
| Tensile Strength (MPa) | | | | | | |
| Yield | 12.4 | 19.9 | 30.3 | 41.4 | 73.1 | 60.7 |
| Break | 20.7 | 24.8 | 24.1 | 28.9 | 70.0 | 58.7 |
| Tensile Modulus (MPa) | 517.1 | 847.4 | 1129.3 | 1615.4 | 2179.7 | 2256.3 |
| Elongation (%) | | | | | | |
| Yield | 10.9 | 11.0 | 10.1 | 5.6 | 6.9 | 5.6 |
| Break | 118.0 | 109.1 | 28.5 | 32.6 | 8.0 | 14.6 |
| Notched Izod Impact (J/m) | 632.4 | 698.0 | 73.7 | 104.7 | 80.6 | 80.6 |
| Delamination | No | No | Slight | Slight | Some | Some |

EXAMPLE 7–11

A series of LR3320 and Zytel® 330 blends, in which the poly(siloxane-carbonate) block copolymer is the major component, were prepared according to the procedure described in Example 1. Mechanical properties for these materials are shown in Table 2, below.

TABLE 2

| Composition | Examples | | | | |
|---|---|---|---|---|---|
| (Weight %) | 7 | 8 | 9 | 10 | 11 |
| LR3320 | 75 | 70 | 65 | 60 | 55 |
| Zytel® 330 | 25 | 30 | 35 | 40 | 45 |
| Mechanical Properties | | | | | |
| Tensile Strength (MPa) | | | | | |
| Yield | 17.3 | 23.5 | 30.4 | 35.2 | 42.1 |
| Break | 25.5 | 29.0 | 34.5 | 35.9 | 33.8 |
| Tensile Modulus (MPa) | 676.2 | 852.8 | 1010.2 | 1049.5 | 1311.7 |

TABLE 2-continued

| Composition | Examples | | | | |
|---|---|---|---|---|---|
| (Weight %) | 7 | 8 | 9 | 10 | 11 |
| Elongation (%) | | | | | |
| Yield | 7.1 | 6.4 | 5.9 | 6.2 | 6.2 |
| Break | 117.7 | 97.8 | 111.4 | 103.7 | 116.7 |
| Notched Izod Impact (J/m) | 753.5 | 849.7 | 976.9 | 1121.2 | 1244.6 |

What is claimed is:

1. A thermoplastic molding composition, which consists essentially of from 55% to 95% by weight of a solidified melt blend of a block polysiloxane-polycarbonate copolymer which is the reaction product of (A) a halogen chain-stopped polydiorganosiloxane composed of from about 5 to 200 chemically combined diorganosiloxy units consisting essentially of dialkylsiloxy units which are connected to each other by silicon-oxygen-silicon linkages wherein each of the silicon atoms has two organo radicals attached through a carbon-silicon bond, and (B) a dihydric phenol having the formula:

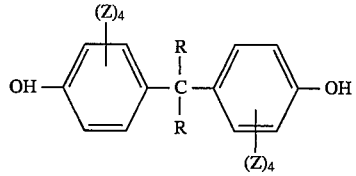

where Z is a member selected from the group consisting of hydrogen, lower alkyl and halogen and combinations, thereof, and R is a member selected from the group consisting of hydrogen, hydrocarbyl and halogenated hydrocarbyl; and phosgenating the purified reaction product with or without additional dihydric phenol until the resulting copolymer achieves a maximum intrinsic viscosity and from 45% to 5% by weight of a thermoplastic polyamide resin having a number average molecular weight of from about 12,000 to about 60,000 g/mole whereby articles molded therefrom are resistant to delamination and have a notched Izod impact of at least about 630 J/m when tested according to ASTM D-256.

2. The composition of claim 1 wherein the copolymer has recurring chain units of the formula:

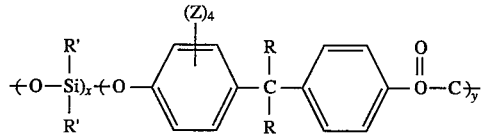

wherein

Z is a member selected from the group consisting of hydrogen, lower alkyl and halogen and combinations, thereof, and R is a member selected from the group consisting of hydrogen, hydrocarbyl and halogenated hydrocarbyl; R' represents lower alkyl; x is an integer of 1 to 200 and y represents an integer such that x+y is 2 to 1000.

3. The composition of claim 1 wherein the polyamide resin comprises the polymerization product of:

(a) terephthalic acid with, trimethylhexamethylenediamine; or (b) isophthalic acid with trimethylhexamethylenediamine; or (c) adipic acid, azelaic acid and 2,2-bis(p-aminocyclohexyl)propane; or (d) terephthalic acid with bis (4-amino cyclohexyl) methane; or (e) isophthalic acid with hexamethylenediamine; or (f) terephthalic acid/isophthalic acid with hexamethylenediamine; or (g) isophthalic and with hexamethylene diamine and metaxylylene diamine; or (h) adipic acid/azelaic acid with diphenyl methane diisocyanate.

4. The composition of claim 1 wherein the polyamide resin is Nylon 6/6, Nylon 6/3, Nylon 6/4, Nylon 6/9, Nylon 6/10, Nylon 6/12, Nylon 6, Nylon 11, Nylon 12 or Nylon 4/6.

5. An article molded from the composition of claim 1.

* * * * *